US012746494B2

(12) United States Patent
Real et al.

(10) Patent No.: US 12,746,494 B2
(45) Date of Patent: Sep. 29, 2026

(54) FILTER SYSTEMS FOR ROOM AIR CONDITIONERS

(71) Applicant: Rheem Manufacturing Company, Atlanta, GA (US)

(72) Inventors: Marcus Real, San Antonio, TX (US); Brittany Calderon, San Antonio, TX (US); Sergio Neaves, San Antonio, TX (US); Clayton Koenning, San Antonio, TX (US)

(73) Assignee: Rheem Manufacturing Company, Atlanta, GA (US)

(*) Notice: Subject to any disclaimer, the term of this patent is extended or adjusted under 35 U.S.C. 154(b) by 366 days.

(21) Appl. No.: 18/116,132

(22) Filed: Mar. 1, 2023

(65) Prior Publication Data

US 2023/0277969 A1 Sep. 7, 2023

Related U.S. Application Data

(60) Provisional application No. 63/325,718, filed on Mar. 31, 2022, provisional application No. 63/315,528, filed on Mar. 1, 2022.

(51) Int. Cl.

*B01D 46/00* (2022.01)
*B01D 46/52* (2006.01)
*F24F 8/108* (2021.01)

(52) U.S. Cl.

CPC ....... *B01D 46/0005* (2013.01); *B01D 46/521* (2013.01); *F24F 8/108* (2021.01); *B01D 2265/06* (2013.01); *B01D 2279/50* (2013.01)

(58) Field of Classification Search

CPC .......... B01D 2265/02; B01D 2265/028; B01D 2265/024; B01D 2267/30; B01D 2265/022
USPC ........................................................... 55/511
See application file for complete search history.

(56) References Cited

U.S. PATENT DOCUMENTS

| | | | | | |
|---|---|---|---|---|---|
| 4,420,315 | A * | 12/1983 | Kershaw | B01D 46/00 | 29/469 |
| 5,342,423 | A * | 8/1994 | Taft | B01D 39/1623 | 55/528 |
| 5,458,667 | A * | 10/1995 | Poggi, Jr. | B01D 46/0006 | 55/480 |
| 7,037,354 | B1 * | 5/2006 | Dimicelli | B01D 46/0002 | 55/497 |
| 7,097,692 | B2 | 8/2006 | Southland et al. | | |
| 8,118,919 | B1 | 2/2012 | Love | | |
| 2010/0001477 | A1 * | 1/2010 | Eyers | F16J 15/025 | 277/628 |
| 2020/0297538 | A1 * | 9/2020 | Xie | A61F 9/027 | |
| 2022/0118399 | A1 * | 4/2022 | Alagouda | B01D 46/0005 | |

* cited by examiner

*Primary Examiner* — T. Bennett Mckenzie
(74) *Attorney, Agent, or Firm* — Eversheds Sutherland (US) LLP

(57) ABSTRACT

The disclosed technology includes a filter having a body that includes one or more notches. The disclosed technology also includes a room air conditioner including a void for receiving the filter. The void can be accessed by an access panel, and the access panel can be located on an outer-face side of the room air conditioner. The room air conditioner can include one or more filter-interfacing structures that can be configured to interface with and/or secure corresponding notches of the filter. The room air conditioner can also include one or more filter retaining brackets configured to releasably secure the filter to the AC unit.

18 Claims, 18 Drawing Sheets

FILTER SYSTEMS FOR ROOM AIR CONDITIONERS

CROSS-REFERENCE TO RELATED APPLICATIONS

This application claims priority to and benefit of U.S. Provisional Patent Application No. 63/315,528, filed Mar. 1, 2022, and U.S. Provisional Patent Application No. 63/325,718, filed Mar. 31, 2022, which are incorporated herein by reference.

BACKGROUND

In view of the COVID-19 pandemic and other concerns, clean air in conditioned spaces has become increasingly important in many instances. Some spaces are conditioned by room air conditioners (e.g., window unit air conditions), but existing room air conditioners typically do not include efficient air filtering systems. Thus, such existing room air conditioners can draw in air contaminated with particulates, pathogens, or the like and recirculate the contaminated air into the space, which can result in an unnecessary spread of disease.

What is needed, therefore, is a room air conditioner having an air filter system that is capable of reducing the amount and/or concentration of particulates, pathogens, or other contaminants in air being circulated into a conditioned space. This and other problems are addressed by the technology disclosed herein.

SUMMARY

The disclosed technology relates generally to filter systems, and particularly air filter systems, for room air conditioners. The disclosed technology includes filters having a body that includes one or more notches. The disclosed technology also includes room air conditioners including a void for receiving the filter. The void can be accessed by an access panel, and the access panel can be located on an outer-face side of the room air conditioner. The room air conditioner can include one or more filter-interfacing structures that can be configured to interface with and/or secure corresponding notches of the filter. The room air conditioner can also include one or more filter retaining brackets configured to releasably secure the filter to the room air conditioner.

Additional features, functionalities, and applications of the disclosed technology are discussed herein in more detail.

BRIEF DESCRIPTION OF THE DRAWINGS

The accompanying drawings, which are incorporated in and constitute a part of this specification, illustrate various aspects of the presently disclosed subject matter and serve to explain the principles of the presently disclosed subject matter. The drawings are not intended to limit the scope of the presently disclosed subject matter in any manner.

DETAILED DESCRIPTION

Figure 1A:
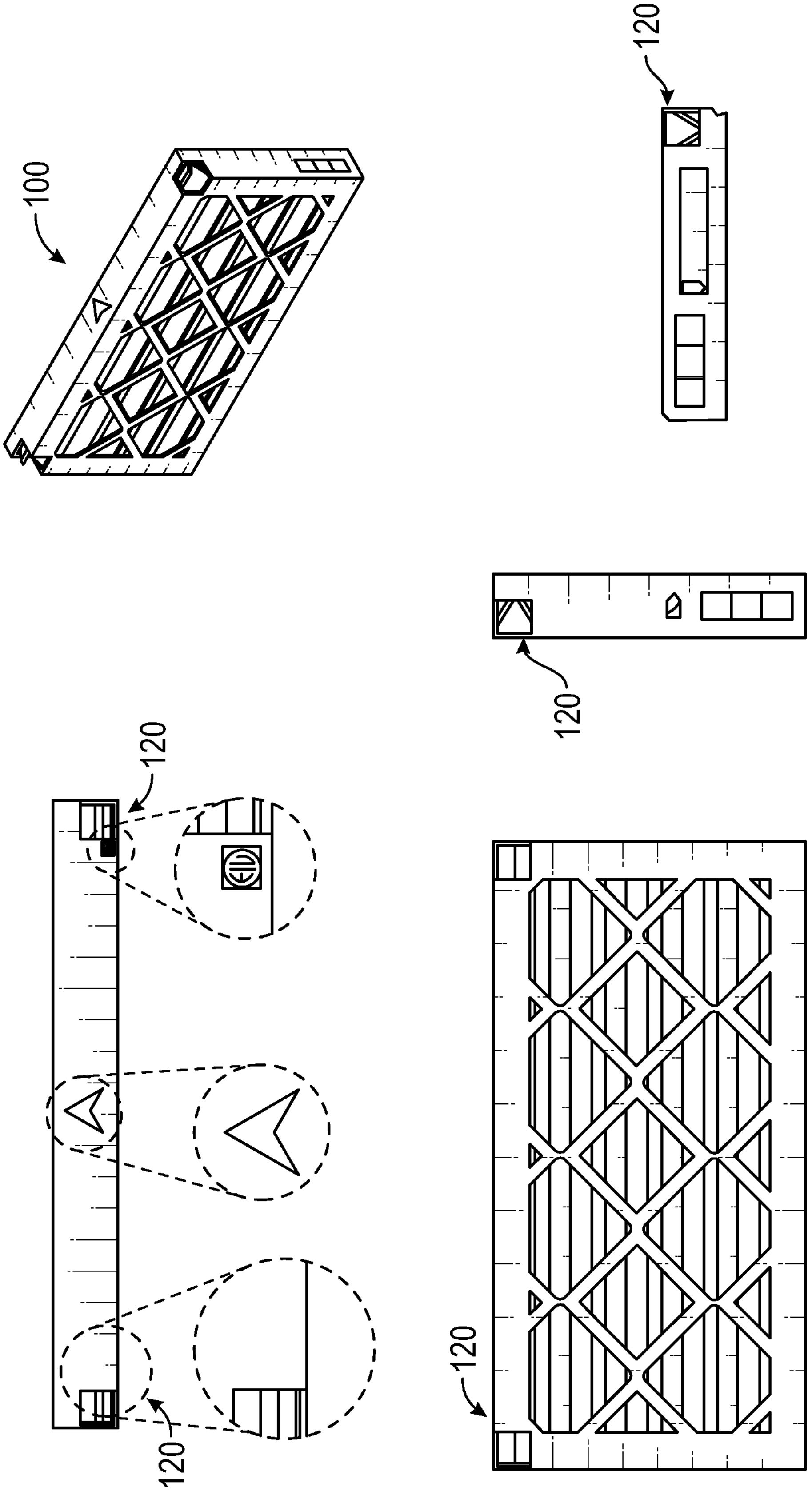
FIGS. 1A-1C each illustrate an example filter, in accordance with the disclosed technology.

The disclosed technology includes filter systems, and particularly air filter systems, for room air conditioners (e.g., wall unit air conditioners). For example, as will be described more fully herein, the disclosed technology includes air filters configured to at least partially insert into a room air conditioner (also referenced herein as "AC unit"). As another example, and as described more fully herein, the disclosed technology includes AC units configured to at least partially receive an air filter and retain the air filter.

It should also be noted that, as used in the specification and the appended claims, the singular forms "a," "an," and "the" include plural references unless the context clearly dictates otherwise. References to a composition containing "a" constituent is intended to include other constituents in addition to the one named.

Also, in describing the disclosed technology, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, the disclosed technology can include from the one particular value and/or to the other particular value. Further, ranges described as being between a first value and a second value are inclusive of the first and second values. Likewise, ranges described as being from a first value and to a second value are inclusive of the first and second values.

It is also to be understood that the mention of one or more method steps does not preclude the presence of additional method steps or intervening method steps between those steps expressly identified. Moreover, although the term "step" can be used herein to connote different aspects of methods employed, the term should not be interpreted as implying any particular order among or between various steps herein disclosed unless and except when the order of individual steps is explicitly required. Further, the disclosed technology does not necessarily require all steps included in the methods and processes described herein. That is, the disclosed technology includes methods that omit one or more steps expressly discussed with respect to the methods described herein.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

The term "pathogen" used throughout this disclosure can refer to potentially harmful viruses, bacteria, fungi, molds, etc. that may be potentially harmful to human or animal occupants of a ventilated space.

The components described hereinafter as making up various elements of the disclosed technology are intended to be illustrative and not restrictive. Many suitable components that would perform the same or similar functions as the components described herein are intended to be embraced within the scope of the disclosed technology. Such other components not described herein can include, but are not limited to, similar components that are developed after development of the presently disclosed subject matter.

Figure 1B:
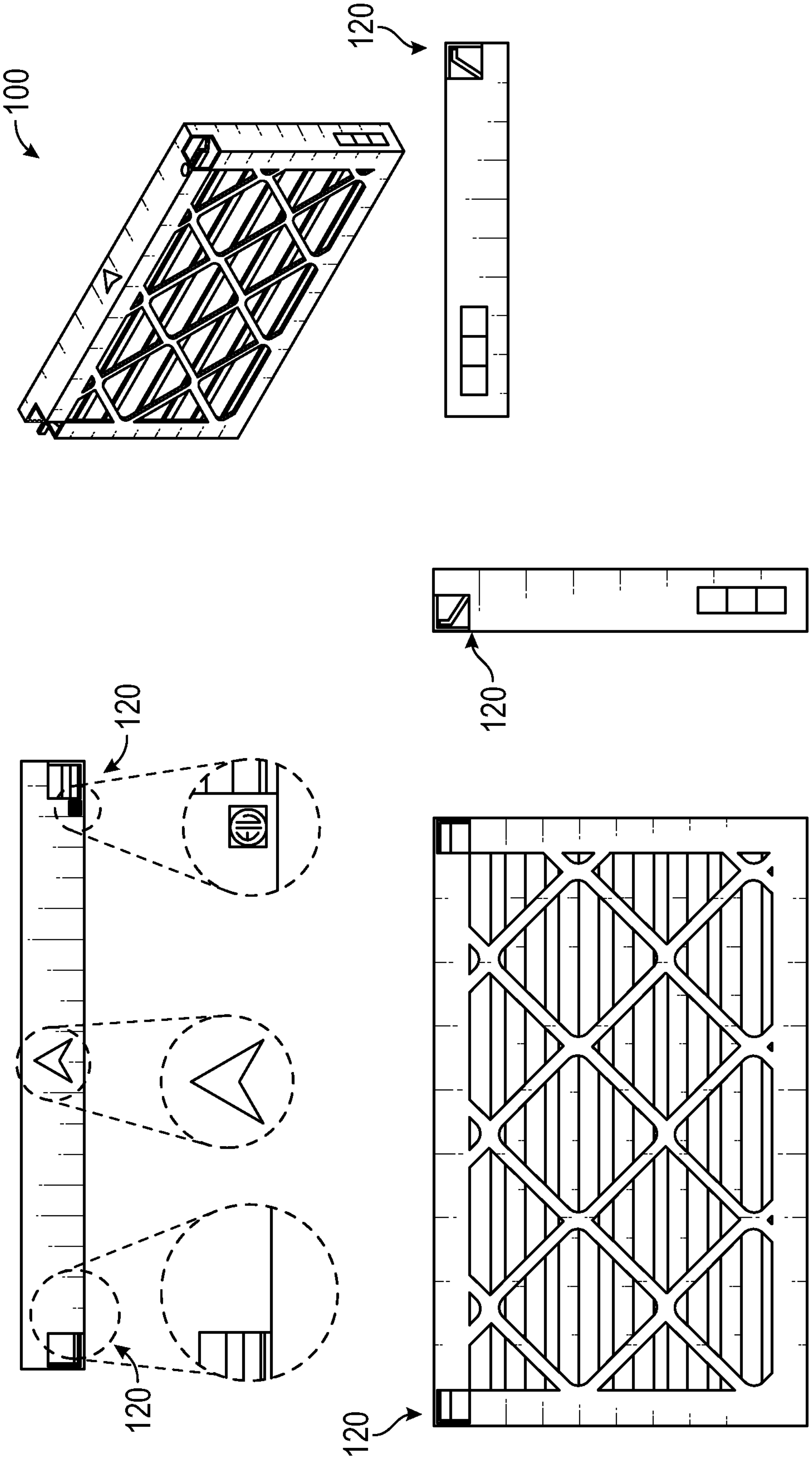
Figure 1C:
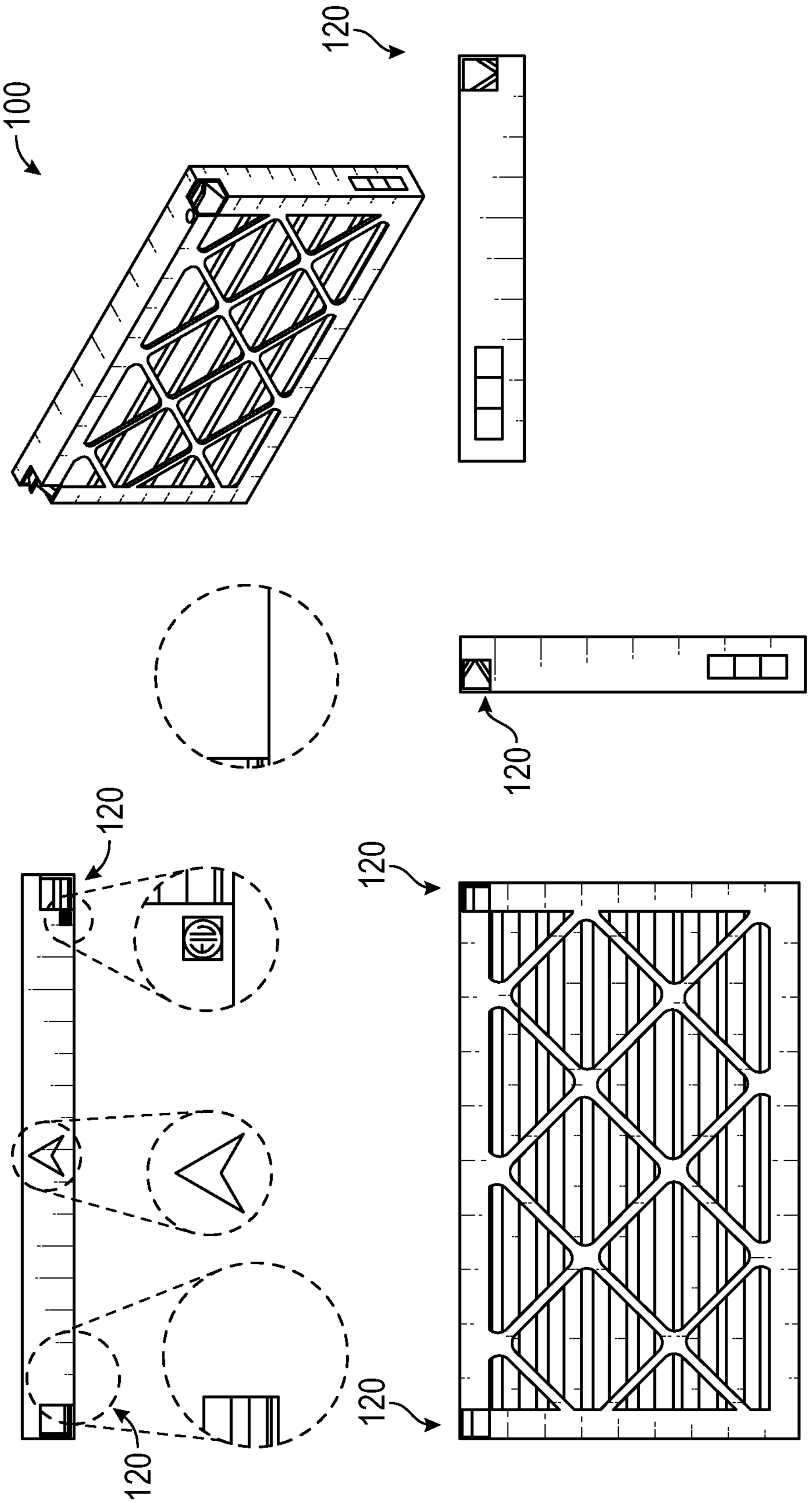

Referring now to the drawings, various view of example air filters 100 according to the present disclosure are shown in each of FIGS. 1A-1C. As a non-limiting example, the filter 100 can be or include a MERV13 filter, a HEPA filter, or any other desired type or rating of filter. However, as will be appreciated, filters generally can have an increased size (e.g., thickness) as the granularity of filtration increases. That is to say, filters that are capable of filtering out increasingly small particles typically have an increasingly large size (e.g., thickness). For example, certain filters can have a thickness of 1-inch, 1.5-inches, 2-inches, 2.5-inches, 3-inches, or any other size. This can prevent such filters from being employed in traditional room air conditioners. As discussed more fully herein, however, the disclosed technology includes AC units configured to receive the filters 100 disclosed herein, which can be rated as a MERV13 filter, a HEPA filter, or any other desired filter rating.

FIGS. 1A-1C each show an example filter 100 having substantially the same structure and design, and the example filters 100 depicted in FIGS. 1A-1C differ primarily in that they are different sizes (e.g., different heights and/or widths). Regardless, the filter 100 can have any desired length or width.

The filter 100 can include a body 110, which can provide structural support for the filter. The body 110 can be made from and/or comprise plastic, metal, cardboard, cardstock, a paper product, or any other useful material. If the filter 100 is intended to be washable and/or reusable, it can be beneficial for the body 110 to be made from a comparatively resilient and/or water resistant material, such as plastic or metal. In contrast, if the filter 100 is intended to have a limited working life (e.g., a single-use filter), it can be sufficient for the body 110 to be made from cardboard, cardstock, some other paper product, or any other comparatively inexpensive materials (e.g., as compared to plastic or metal).

The body 110 of the filter 100 can structurally support a filter medium 130, which can be any desired filter medium. As discussed herein, the filter medium 130 can be or include a MERV13 filter, a HEPA filter, or any other desired type or rating of filter.

The filter 100 can include one or more notches 120, which can comprise a recess or cut-out extending into the body 110. For example, a given notch 120 can be located on an outward-facing side of the filter 100 (when installed in the AC unit). As depicted, the filter 100 can include a notch 120 in either upper corner of the outward-facing side of the filter 100. Alternatively or in addition, the filter 100 can include one or more notches 120 in the lower corners and/or on the inner-facing side of the filter 100 (when installed in the AC unit). Each notch 120 can be formed by a cutout of material from the body 110 of the filter 100. A notch 120 located at the corner of the body 110, for example and as depicted, can be formed by a cutout of material from an outward-facing side of the filter 100, a cutout of material from a top side of the filter 100, and cutout of material from a lateral end of the filter 100. The cutouts from each of these surfaces (e.g., outward-facing side, top side, lateral end) can be adjacent to one another. The notch 120 can include a cutout from one, some, or all of these surfaces. Alternatively or in addition, a given notch 120 can include a cutout from one, some, or all of an inner-facing side, a bottom side, and the opposite lateral end.

As shown, each notch 120 can include a structure 140 located within and exposed via the notch 120. The structure 140 can be or include an angled or V-shaped component, which can be configured to interface with the AC unit, thereby securing the air filter in the AC unit. Alternatively or in addition, the structure 140 can include a protrusion or other structure configured to interface with the AC unit.

Figure 2:
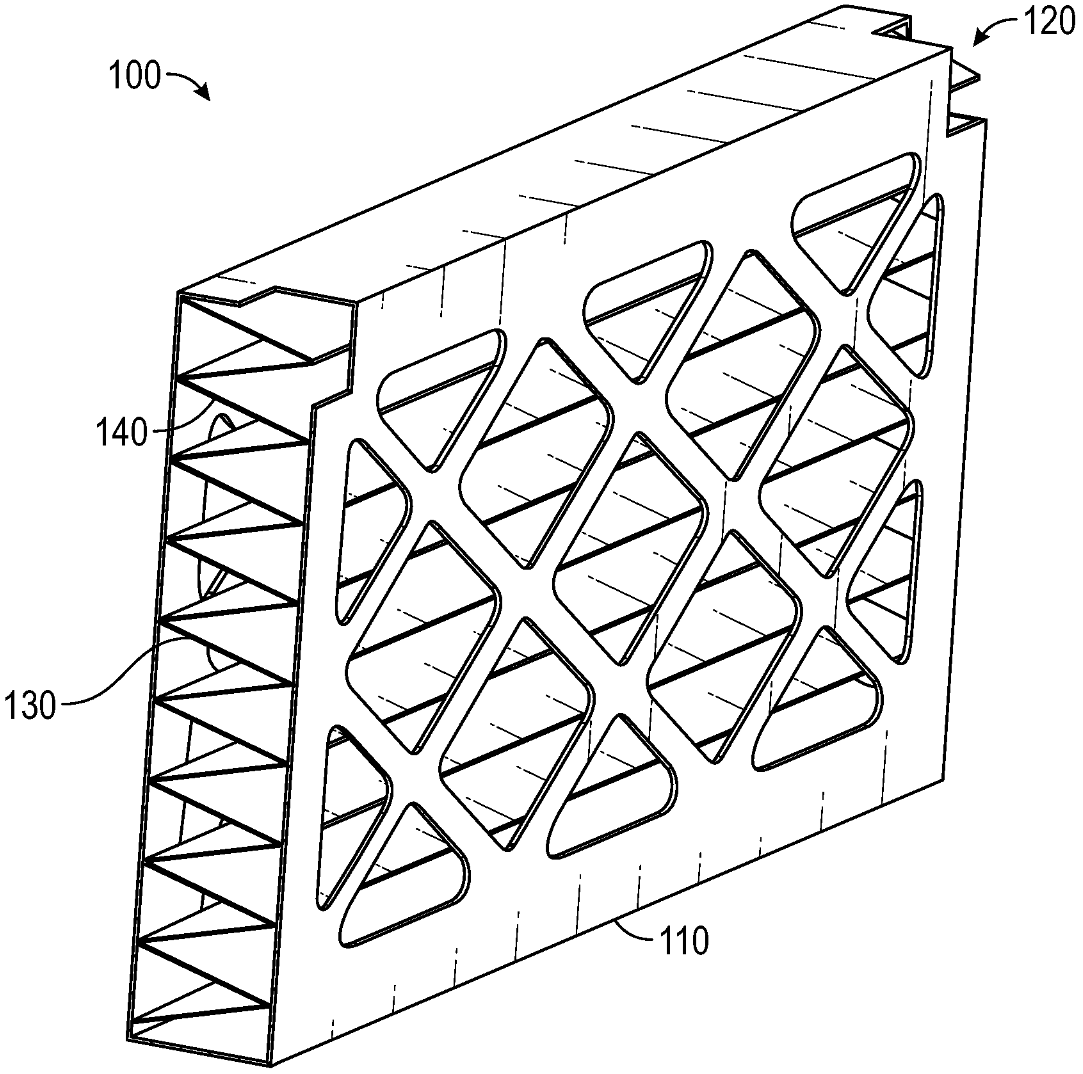
FIG. 2 illustrates a cross-sectional view of an example filter, in accordance with the disclosed technology.
Figure 3A:
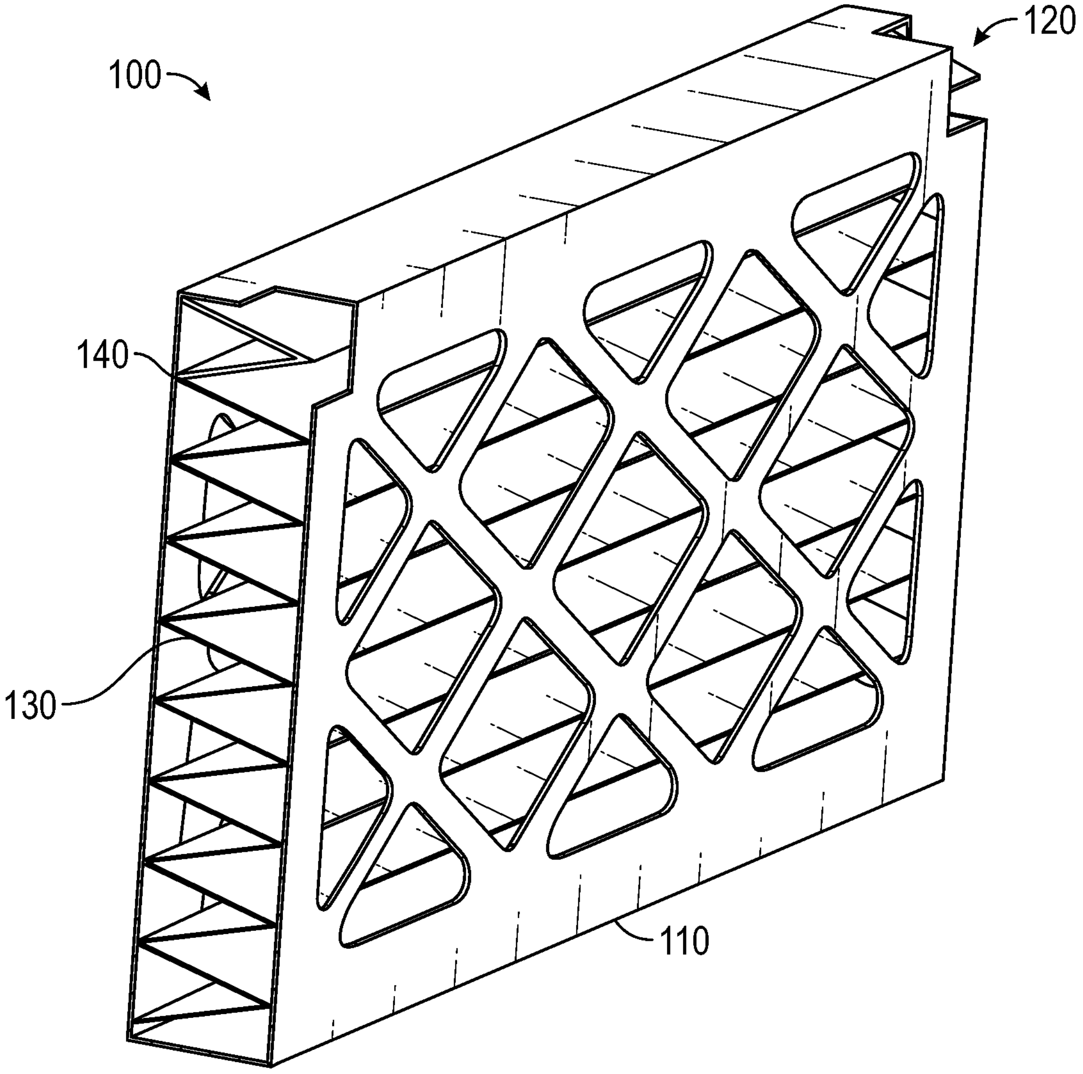
FIG. 3A illustrates a perspective cross-sectional view of an example filter, in accordance with the disclosed technology.
Figure 3B:
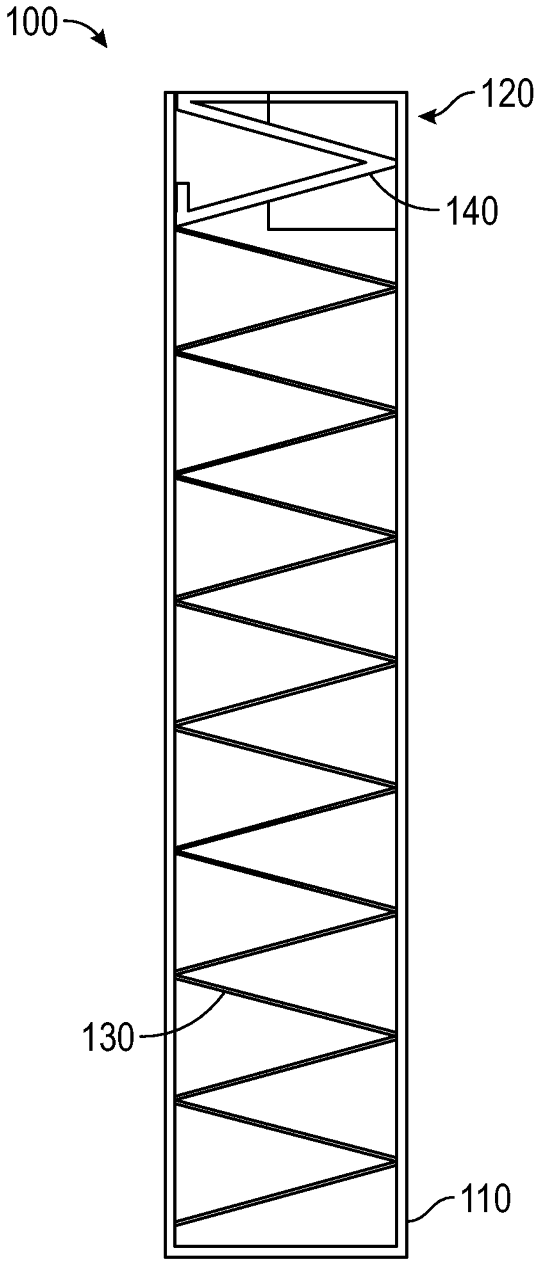
FIG. 3B illustrates a cross-sectional view of an example filter, in accordance with the disclosed technology.

The structure 140 can be or include one or more of a variety of materials. For example, as shown in FIG. 2, the structure 140 can be formed by one or more folds of the filter medium 130. Alternatively, the structure 140 can be separate from the filter medium 130, such as is depicted in FIGS. 3A and 3B, for example. Referring to FIG. 3A, the structure 140 can be separate and distinct from the filter medium 130 and the body 110. Alternatively, and referring to FIG. 3B, the structure 140 can be integral with the body 110. For example, the body 110 and the structure can be cut, folded, and assembled from a single blank of material. It should be noted that the folded configuration shown in FIG. 3B is but one possible configuration and others are contemplated. The structure 140 and the body 110 can be or comprise the same material(s). Alternatively, the structure 140 can be made from or comprise a material that is different from the material(s) of the body 110.

Regardless of the composition of the structure 140, the structure 140 can extend across the width (or height, as desired) of the filter 100. Alternatively, the dimensions of a given structure 140 can approximately match those of the corresponding notch 120. That is to say, for example, the width of the structure 140 can approximately equal the width of the notch 120.

Referring now to FIGS. 4A-4D, the filter 100 can include a buffer material 150. As shown, the buffer material 150 can be located on the back or outer-facing side of the filter 100. For example, the buffer material 150 can be configured to separate the body 110 and/or filter medium 130 from one or more components of the AC unit, such as a heat exchanger coil. Thus, the buffer material 150 can help prolong the working life of the filter at least by preventing the body 110 and/or filter medium 130 from getting wet. This can be particularly useful if the body 110 comprises cardboard, cardstock, or any other material susceptible to degradation when wet. The buffer material 150 can comprise a closed-cell foam and/or any other material for creating a resilient barrier from water (e.g., plastics).

Figure 4A:
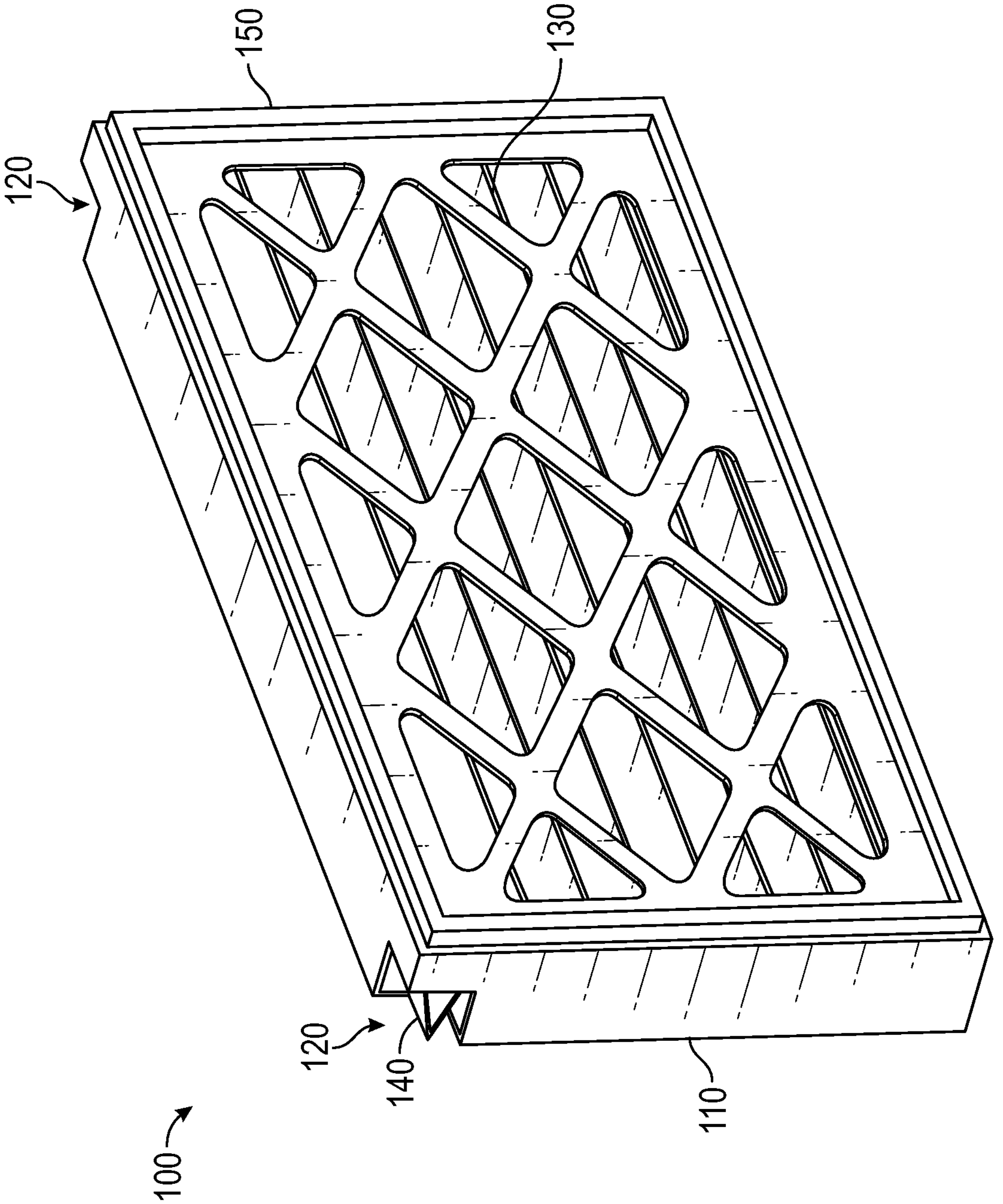
FIGS. 4A-4D illustrates the back side of example filters, in accordance with the disclosed technology.
Figure 4B:
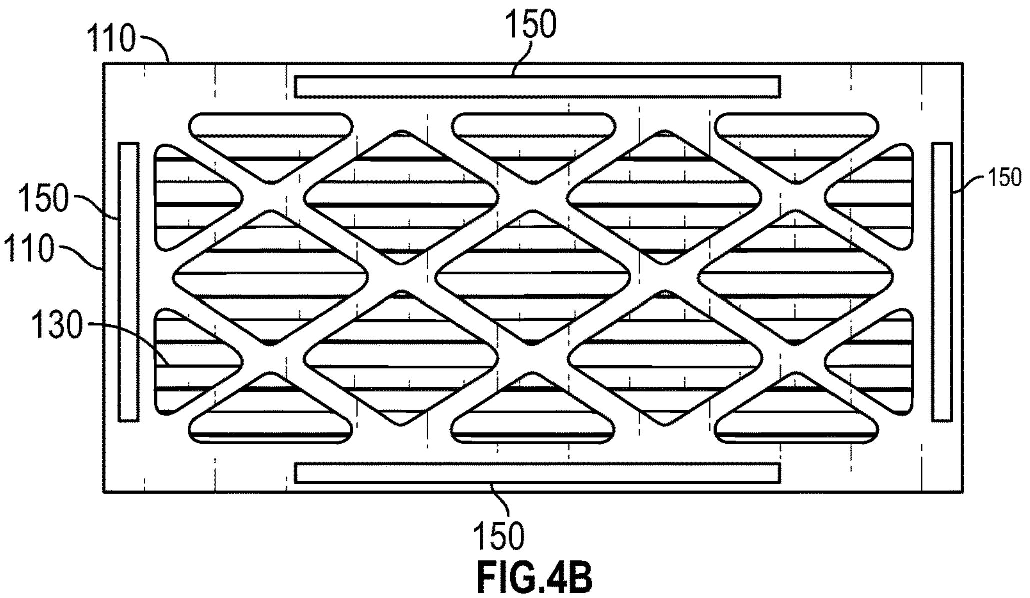
Figure 4C:
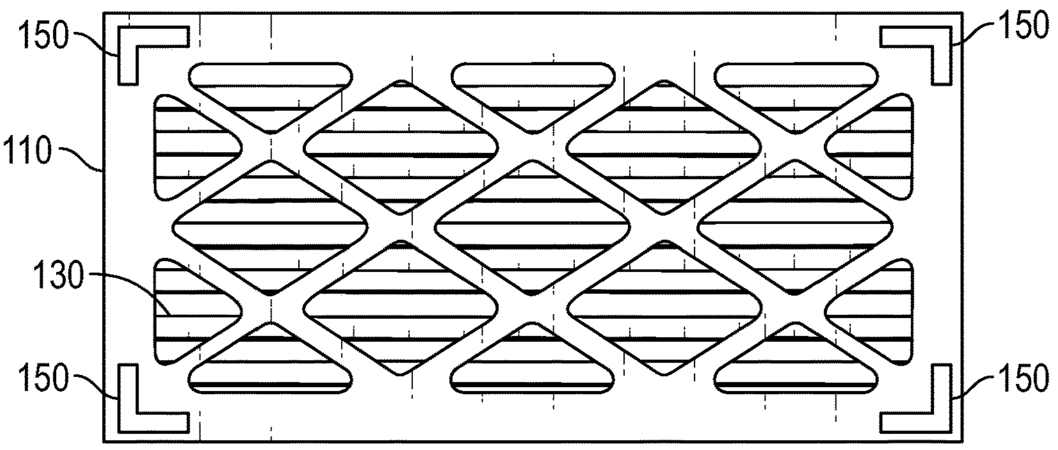
Figure 4D:
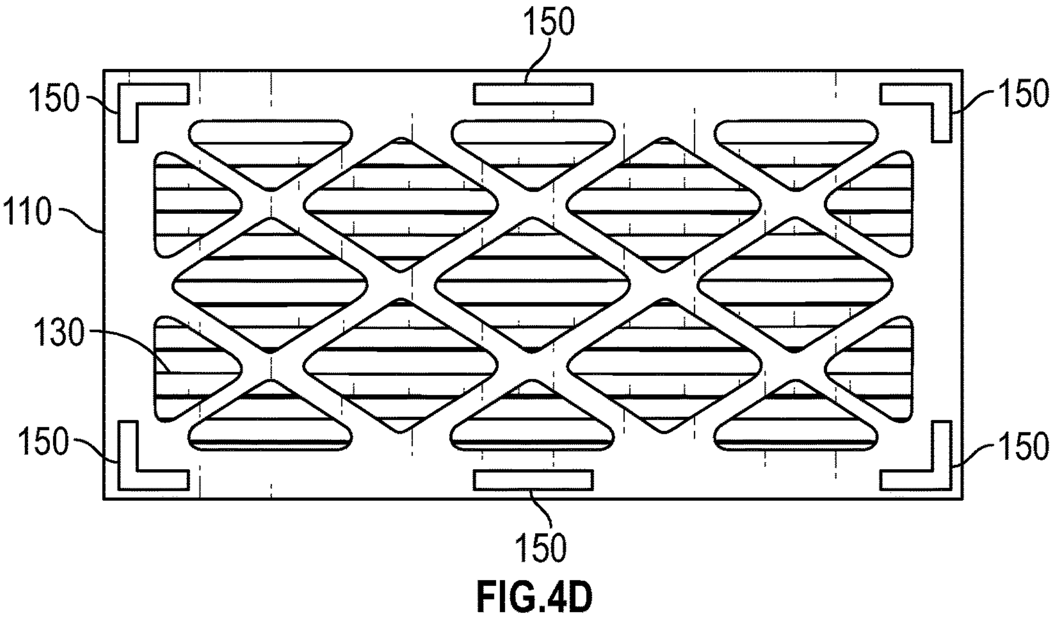

FIGS. 4A-4D depict different arrangements of the buffer material 150. For example, the buffer material 150, can extend around all, or substantially all, of the perimeter of the face of the filter 100, as in FIG. 4A, for example. Alternatively, the buffer material 150 can be located at one or more discrete positions, such as at one or more corners and/or along one or more sides of the face, non-limiting examples of which are depicted in FIGS. 4B-4D. The length, width, thickness, and shape of a given piece of buffer material 150 can be tailored to the specific dimensions and configuration of a given filter 100 and the corresponding AC unit. For example, the dimensions, shape, number, and positioning of the buffer material 150 can be selected to maximize the realized benefits (e.g., protection of the filter 100 from water) while minimizing the amount of buffer material 150 used.

The filter 100 can include a gasket or seal, which can be located on some or all of the outer edge of the body 110, some or all of the outer-facing side of the body 110, and/or some or all of the inner-facing side of the body 110. As will be appreciated, this can help ensure that all, or substantially all, passing air flows through the filter medium 130, rather than around the filter 100.

Figure 5A:
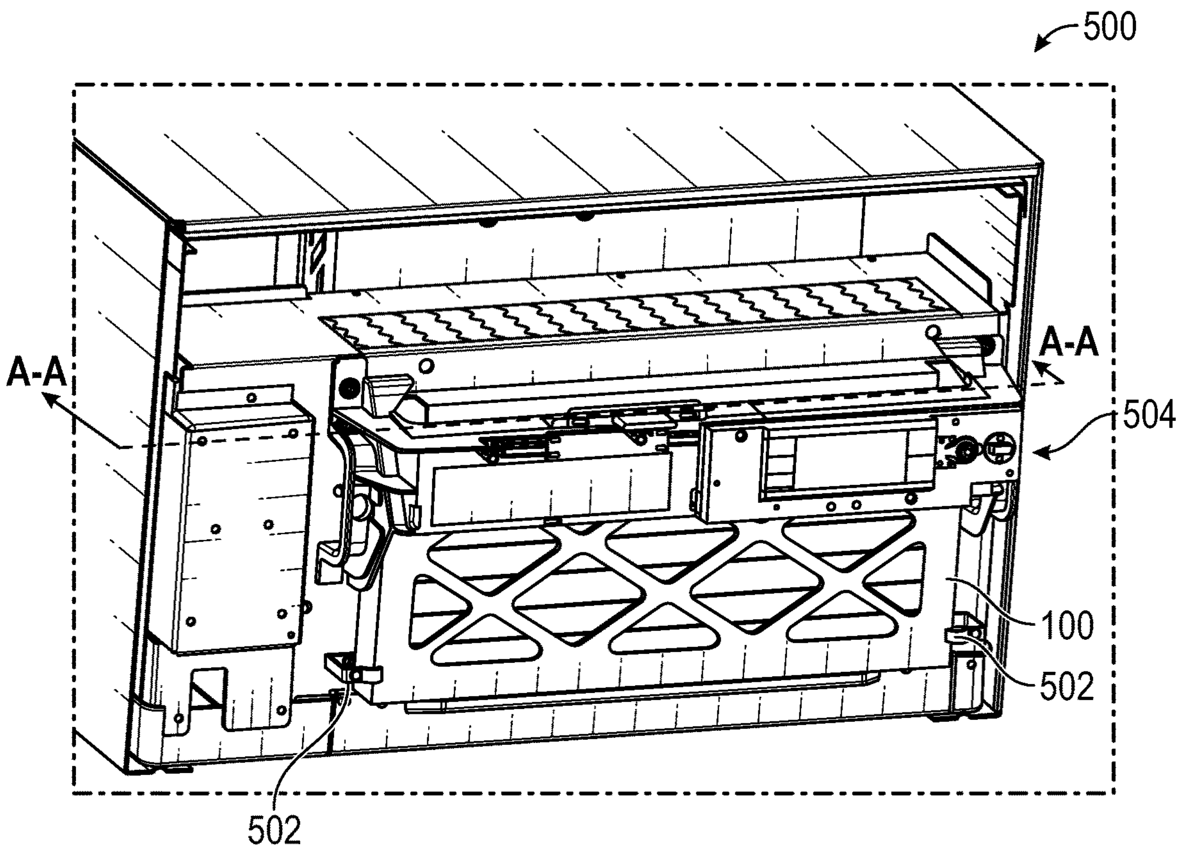
FIGS. 5A and 5B illustrate a front side of an example room air conditioner with FIG. 5A depicting a three-dimensional model thereof and FIG. 5B depicting a line drawing thereof, in accordance with the disclosed technology.
Figure 5B:
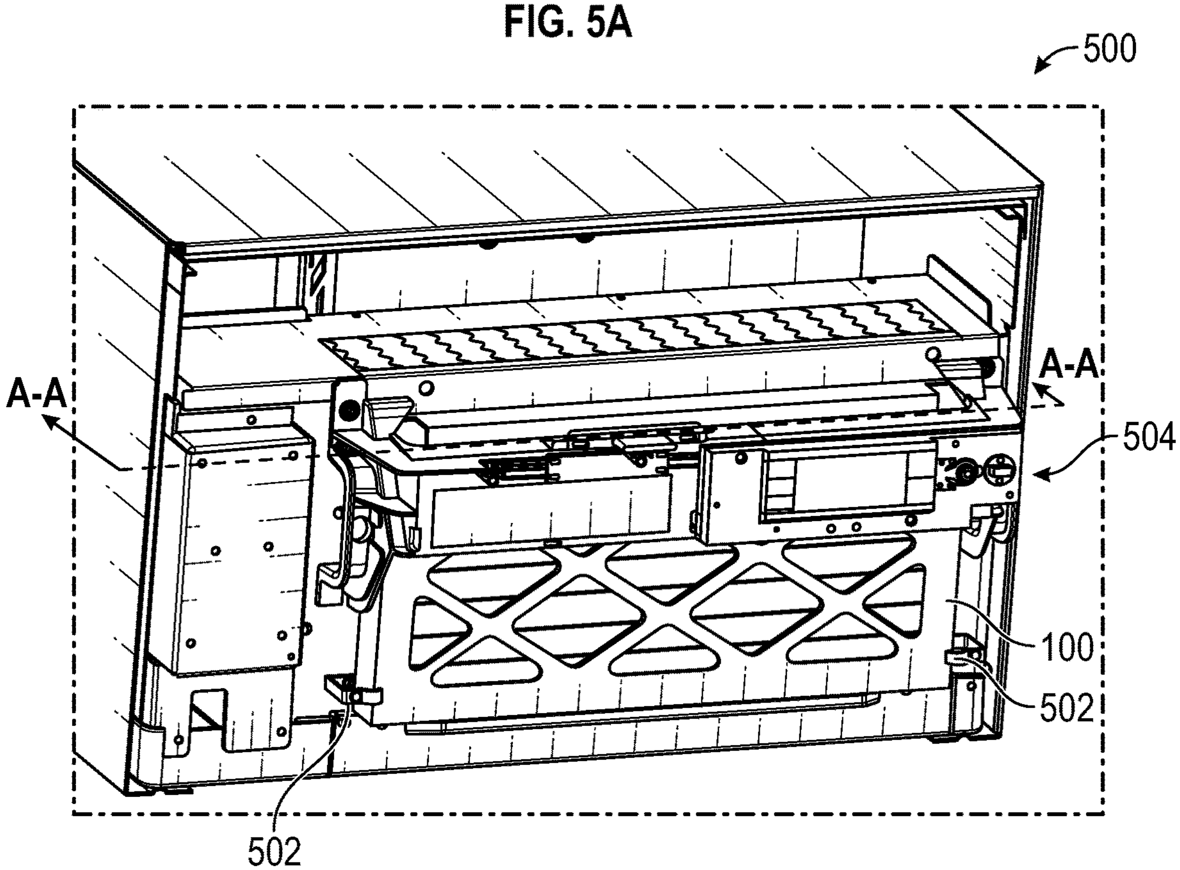

Turning now to FIGS. 5A and 5B, the filter 100 can be configured to insert into an AC unit 500. FIGS. 5A and 5B illustrate an example AC unit 500 with the face plate removed for clarity of illustration. As can be seen, the filter 100 can be inserted into the front portion of the AC unit 500 that faces into the conditioned space. The front portion of the AC unit 500 van include a vent portion and an access panel, which can be or include the face plate, which is omitted from FIGS. 5A and 5B, as previously mentioned (an example face plate can be seen in FIG. 9A, however). The access panel can be configured to hinge outward, revealing a void between the front edge of the AC unit 500 interior and the indoor heat exchanger coil, otherwise referenced as the indoor coil.

The AC unit 500 can include one or more filter retaining brackets 502. As illustrated, the filter retaining brackets 502 can be located at or near the bottom of the void, such that the filter retaining brackets are configured to secure the bottom portion of the filter AC unit 500. However, the filter retaining brackets 502 can be positioned at any desired location. For example, alternatively or in addition, one or more filter retaining brackets 502 can be located proximate a top end of the filter 100. The filter retaining brackets 502 can be any type of clamp or bracket. As shown, the filter retaining brackets 502 can include an arm configured to contact and retain the filter, and the arm can be configured to rotate about a pivot point, such that the arm can be rotated outwardly to provide clearance for the filter 100 to be installed or removed. When rotated inwardly, the arm of the filter retaining bracket 502 can be configured to retain the filter 100 in a secure, installed position. The filter retaining brackets 502 can be configured to be hand loosened/tightened, or the filter retaining brackets 502 can be configured to be rotated via a driver (e.g., a nut driver).

Figure 6A:
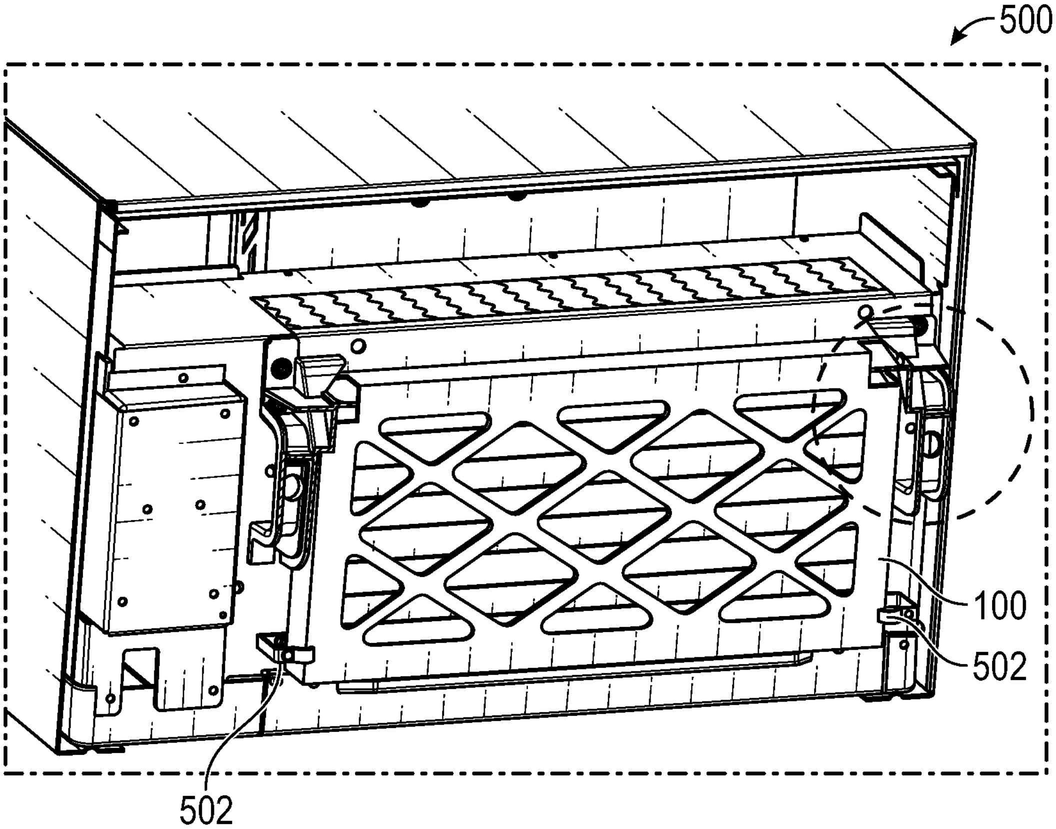
FIGS. 6A and 6B illustrate a cross-sectional view taken along line A-A in of the example room air condition shown in FIGS. 5A and 5B, respectively, with FIG. 6A depicting a three-dimensional model thereof and FIG. 6B depicting a line drawing thereof, in accordance with the disclosed technology.
Figure 6B:
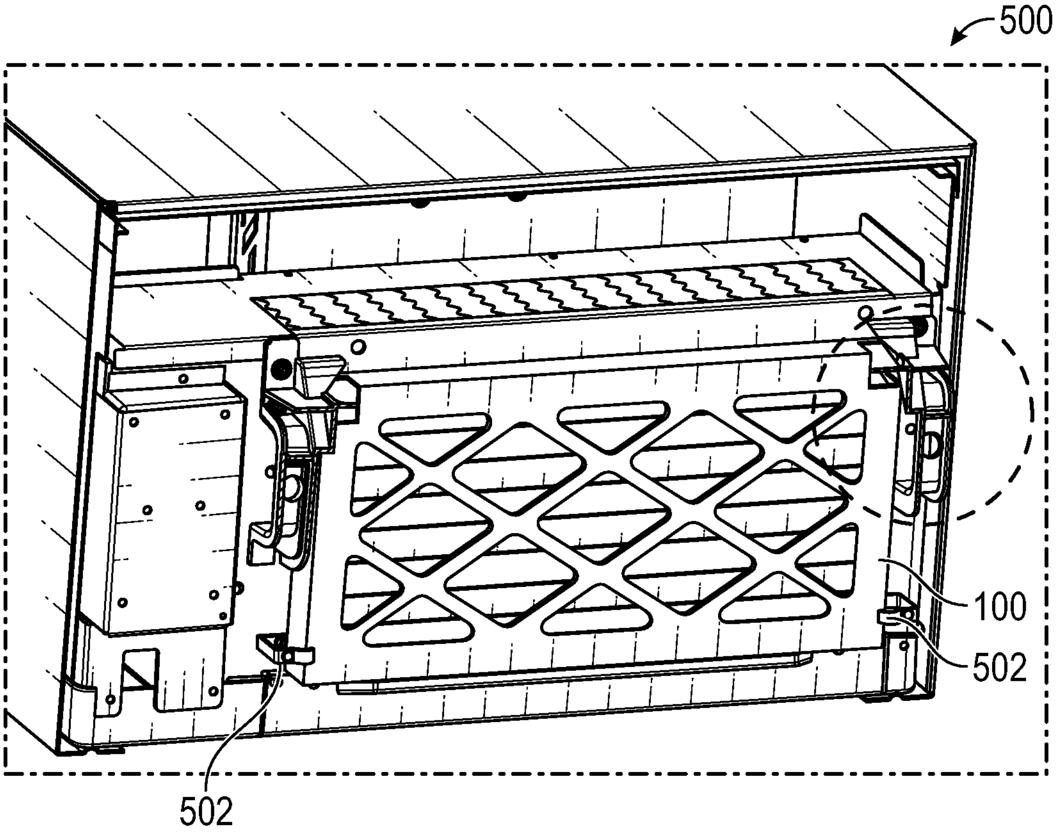

The AC unit 500 can include a bracket 504 or other support structure. For example, as illustrated, the AC unit 500 can include a support bracket 504, which can be configured to physically support user interface components (e.g., input buttons, a display) and/or some or all of the controller of the AC unit 500. The back side of the bracket 504 can at least partially define a void configured to at least partially receive the filter 100. Thus, the filter 100 can be inserted into the AC unit such that the filter 100 is positioned in the void behind the bracket 504. As such, the bracket 504 can be configured to retain at least a portion (e.g., the top portion) of the filter 100. FIGS. 6A and 6B are cross-sectional views taken along line A-A in FIGS. 5A and 5B, respectively, and are included to illustration the installed position of the filter 100 with substantially all of the bracket 504 omitted for clarity of illustration.

Figure 7A:
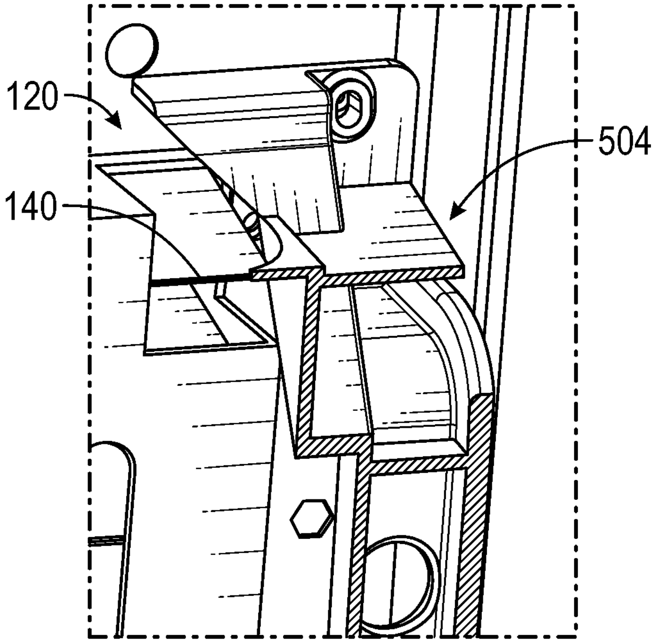
FIGS. 7A and 7B illustrate an enlarged view of the callout of FIGS. 6A and 6B, respectively, with FIG. 7A depicting a three-dimensional model showing a notched corner of an example filter interfacing with the example room air condition and FIG. 7B depicting a line drawing thereof, in accordance with the disclosed technology.
Figure 7B:
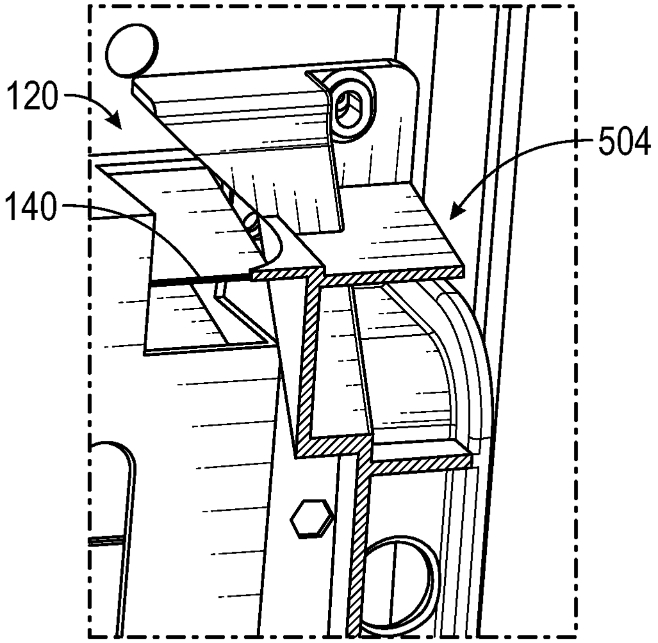
Figure 8A:
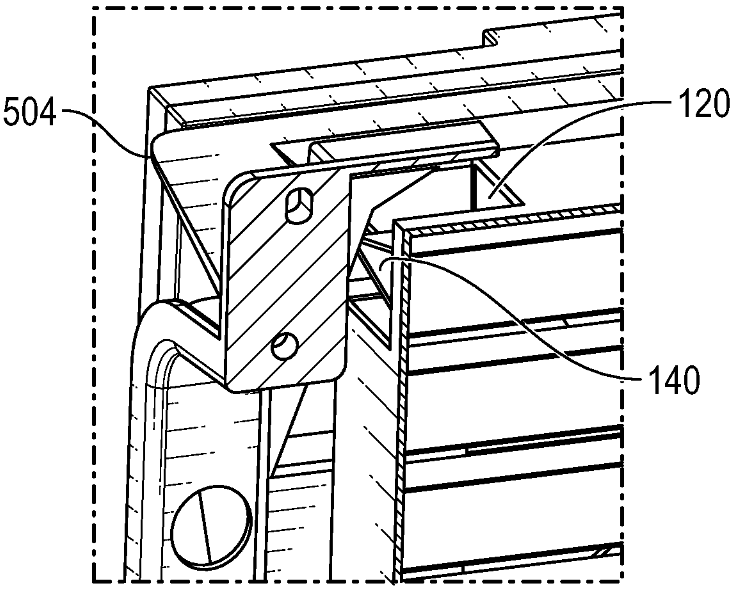
FIGS. 8A and 8B illustrate an enlarged view of a notched corner of an example filter interfacing with the example room air condition shown from the opposite perspective of FIGS. 7A and 7B, respectively, with FIG. 8A depicting a three-dimensional model thereof and FIG. 8B depicting a line drawing thereof, in accordance with the disclosed technology.
Figure 8B:
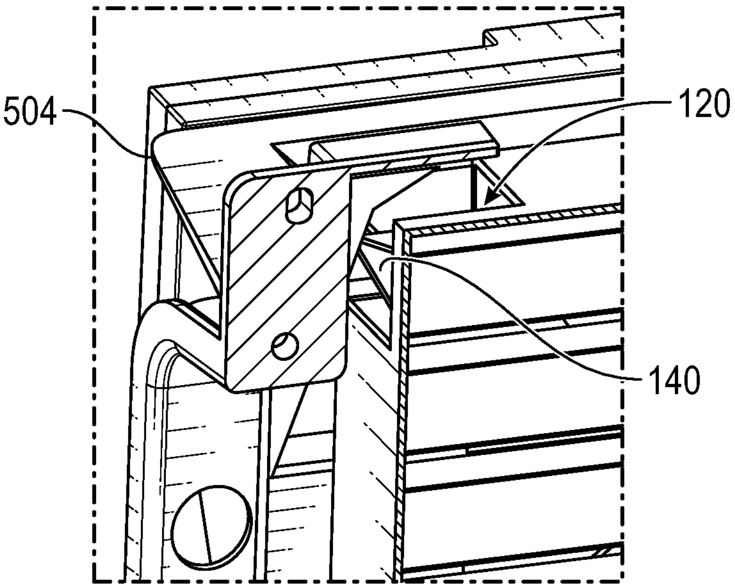

FIGS. 7A and 7B are enlarged views corresponding to the callout shown in FIGS. 6A and 6B, respectively, and FIGS. 8A and 8B are enlarged views corresponding to an opposite perspective as FIGS. 7A and 7B (i.e., facing into the conditioned room). As can be seen, the bracket 504 (e.g., the back or outer-facing side of the bracket 504) can be configured to interface with the notch 120 and/or the structure 140 of the filter 100. For example, the bracket 504 can include a recess configured to receive at least a portion of the notch 120 and/or structure 140. Alternatively or in addition, the bracket 504 can include a protrusion configured to extend into the notch 120 or otherwise interface with the notch 120 and/or structure 140. In such cases, the protrusion can be resiliently deformable so as to deform upon insertion or removal of the filter 100 and can return to its original shape once the filter 100 has been fully inserted (or removed) to thereby retain the filter 100 in the proper position within the AC unit 500. Alternatively or in addition, the structure 140 of the filter 100 can be resiliently deformable so as to deform upon contact with the protrusion or other portion of the bracket during insertion or removal of the filter 100, and the structure 140 can return to its original shape once the filter 100 has been fully inserted to thereby retain the filter 100 in the proper position within the AC unit 500.

Figure 9A:
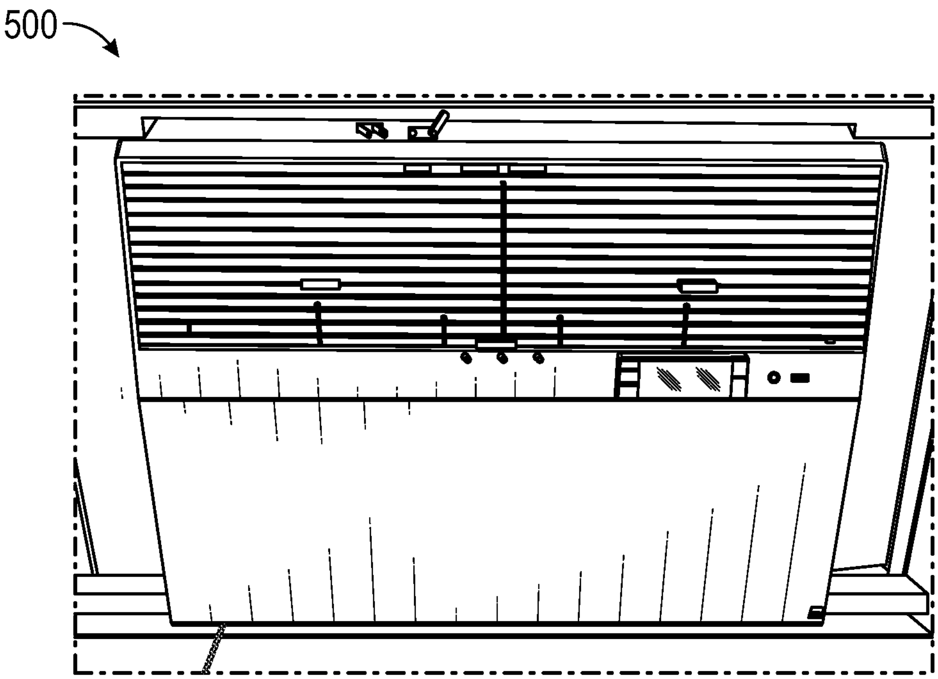
FIGS. 9A-9D illustrate an example room air conditioner and a method for installing a filter into the example room air conditioner, in accordance with the disclosed technology.
Figure 9A:
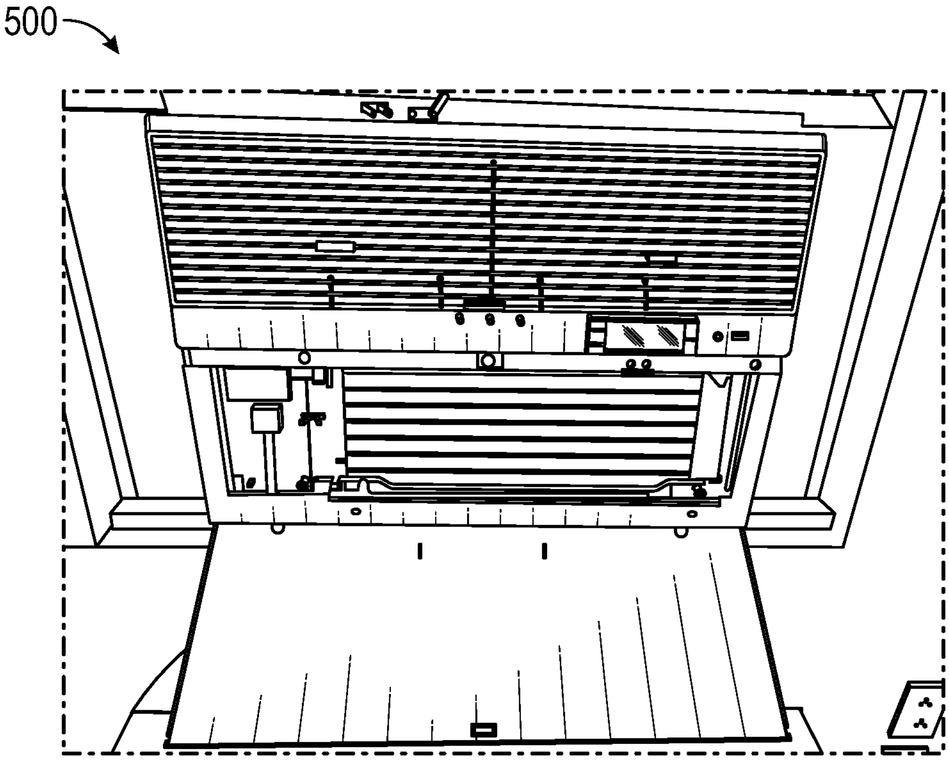
Figure 9B:
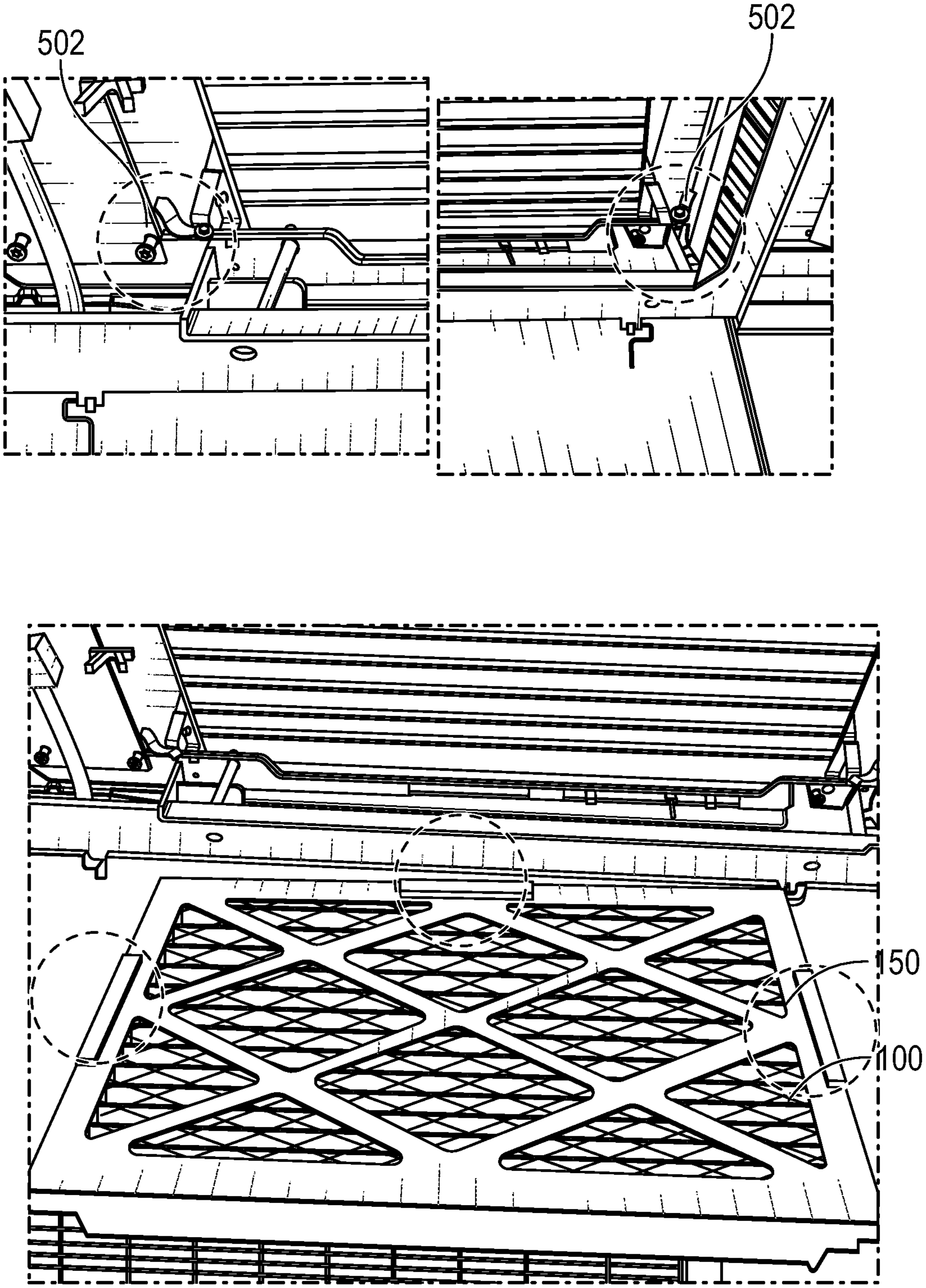
Figure 9C:
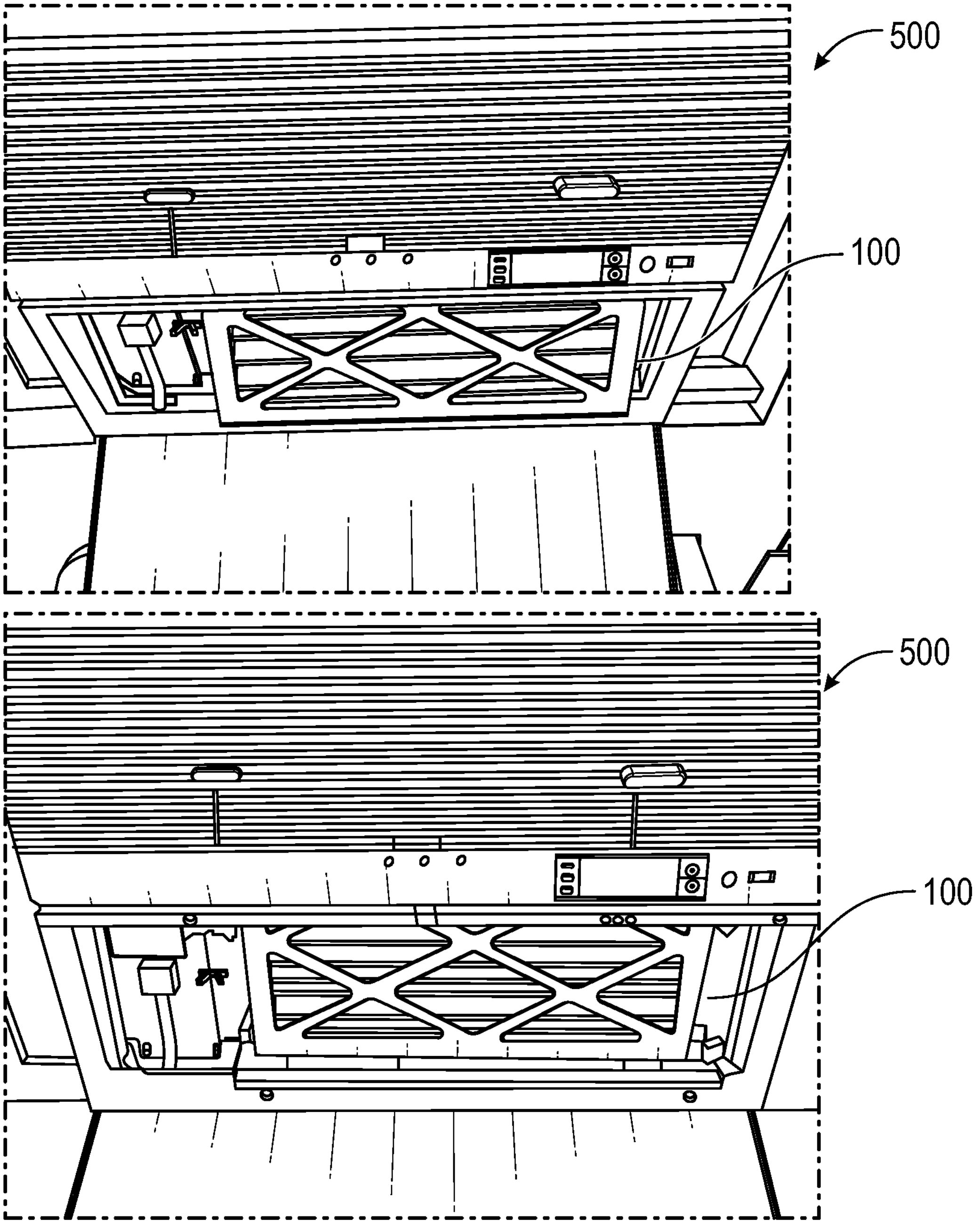

To install the filter 100, and referring to FIGS. 9A-9C, the front plate of the AC unit 500 can be opened to access the void into which the filter 100 can be inserted. The filter retaining brackets 502 can be transitioned to an open state, and the top of the filter 100 can be inserted into the void in the AC unit 500 and slid upwardly. Doing so can interface the notches 120 and/or structures 140 of the filter 100 with one or more filter-interfacing structures (e.g., protrusions or other structures, such as the bracket 504, configured to interface and/or secure the filter 100). As a non-limiting example, the filter-interfacing structures can be located on an inner-facing side of the AC unit 500's manifold. Alternatively or in addition, the filter-interfacing structures can be located on a bracket 504 or other structure located within the AC unit 500, as previously discussed.

Figure 9D:
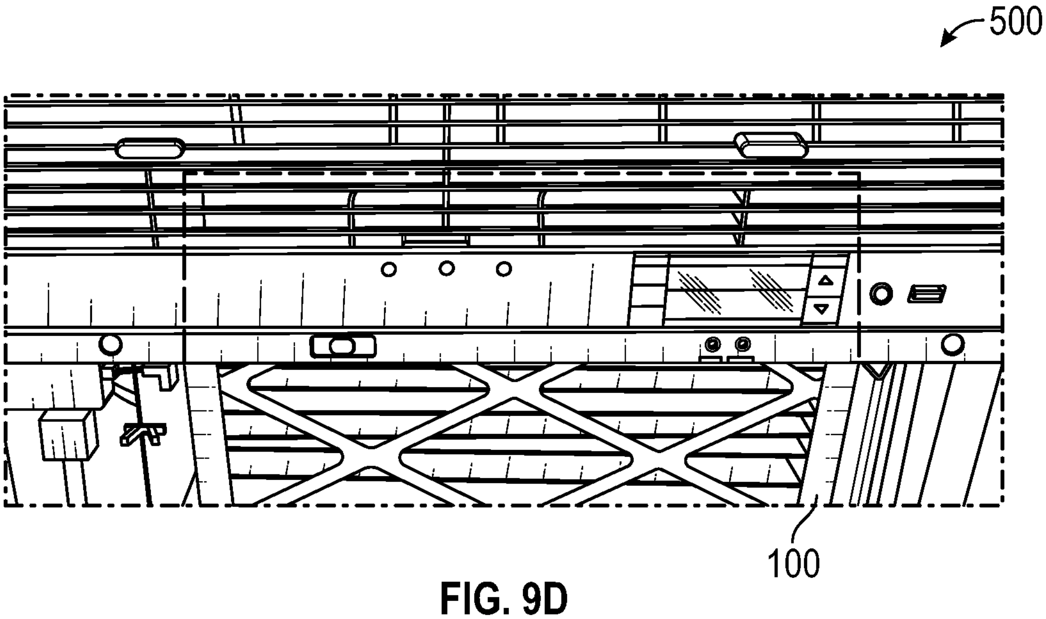

As shown by the dotted lines in FIG. 9D (which is an enlarged view of the lower image of FIG. 9C), the filter 100 can extend behind the controls of the AC unit 500 and cover all, or substantially all, of the indoor coil. That is to say, the filter 100 can be configured to cover all, or substantially all, of the air intake portion of the AC unit 500. As such, the filter 100 can be configured to filter air before it passes over the indoor coil and is subsequently outputted by the AC unit 505 via one or more air outlets. As shown, the air outlet(s) can be positioned at the upper area of the vent portion (while a lower area of the vent portion can correspond to the air intake).

Figure 10A:
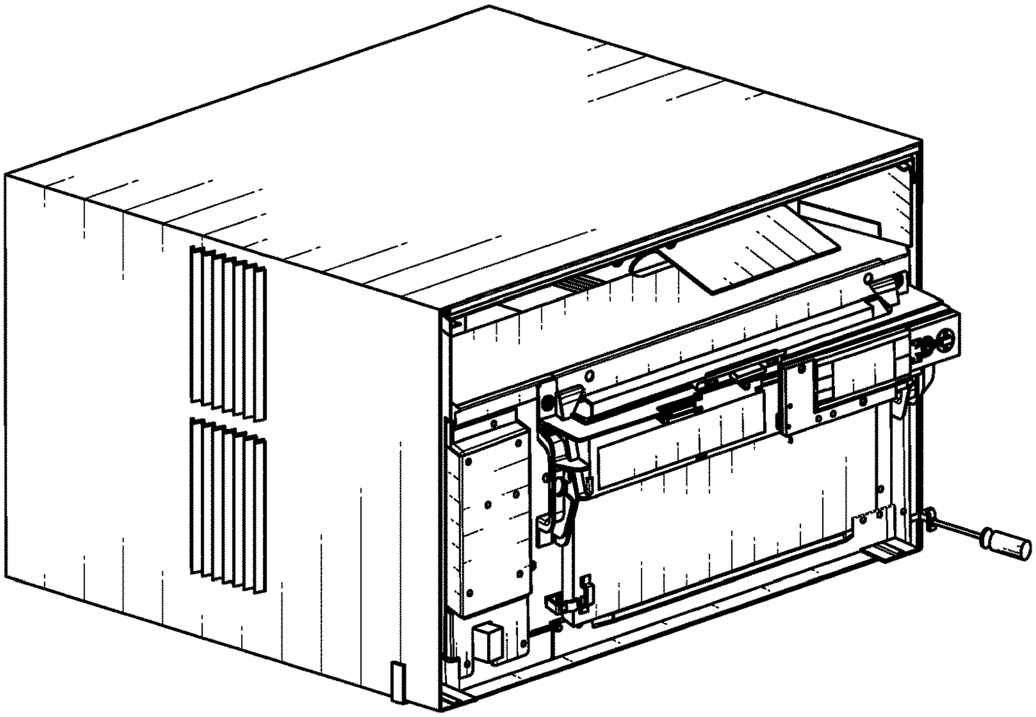
FIG. 10 illustrates an example room air conditioner and a method for installing a filter into the example room air conditioner, in accordance with the disclosed technology.
Figure 10B:
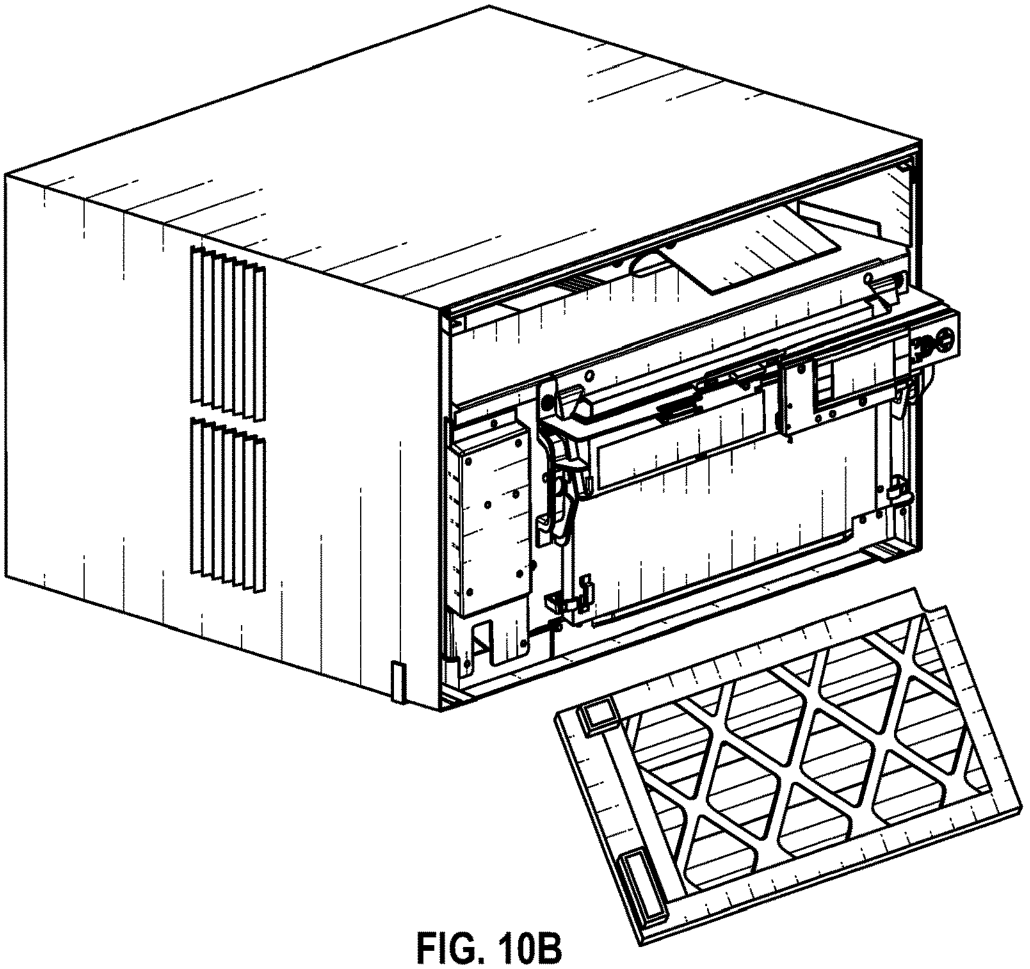
Figure 10C:
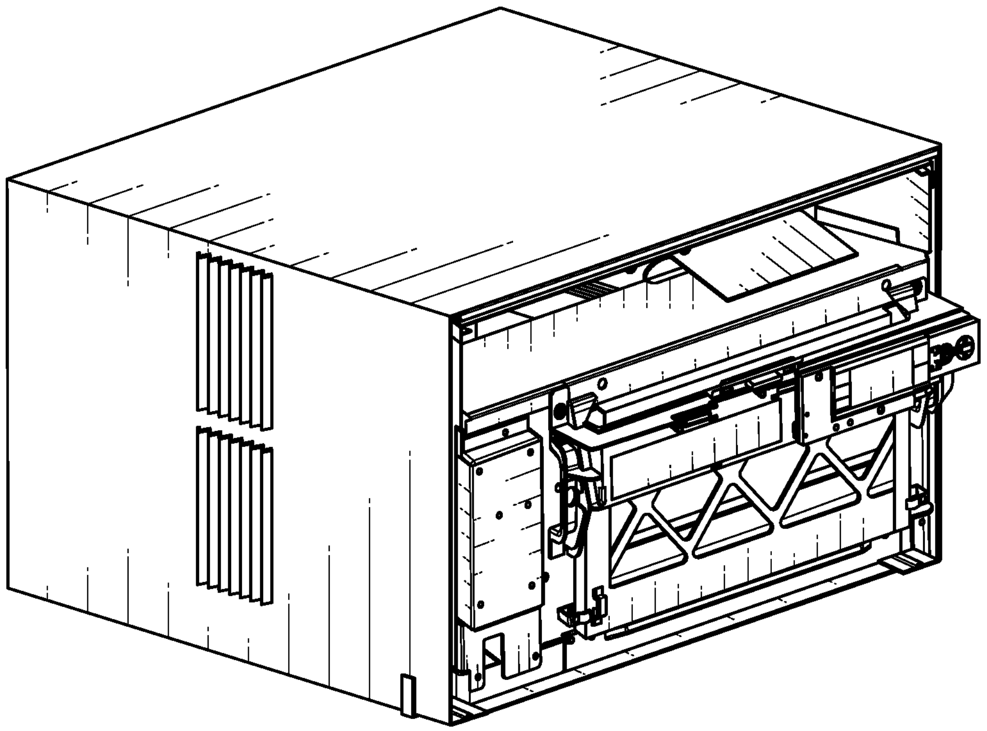

Once the filter 100 is installed, the filter retaining brackets 502 can be rotated to secure the filter in place. When installed, the filter 100 can be configured to rest on the base plate of the AC unit, for example. FIG. 10 provides another recitation of a method for installing the filter 100. For illustrative purposes, the front portion (e.g., face plate) of the AC unit 500 is also omitted in FIG. 10. As can be seen in the illustrations of FIG. 100, the void for receiving the filter 100 can include a space between the bracket 504 (e.g., which can hold the control components and/or user input components) and the indoor coil.

While the AC unit 500 has been described and shown heretofore as a window unit air conditioner, the disclosed technology is not so limited. For example, the AC unit 500 can be or include a packaged terminal air conditioner (PTAC) or any other type of air conditioner.

Further, while the filter has been described heretofore as being configured to filter the air being drawn in by the AC unit 500, the filter 100 can be alternatively, or additionally, configured to filter air being discharged from the AC unit 500.

While the present disclosure has been described in connection with a plurality of exemplary aspects, as illustrated in the various figures and discussed above, it is understood that other similar aspects can be used, or modifications and additions can be made to the described subject matter for performing the same function of the present disclosure without deviating therefrom. In this disclosure, methods and compositions were described according to aspects of the presently disclosed subject matter. But other equivalent methods or compositions to these described aspects are also contemplated by the teachings herein. Therefore, the present disclosure should not be limited to any single aspect, but rather construed in breadth and scope in accordance with the appended claims.

What is claimed is:

1. An air filter comprising:

a body comprising a pair of horizontal members, a pair of vertical members, a first face, and a second face, the body further comprising:

a first notched corner formed by a first cutout on the first face, a second cutout on a first vertical member in the pair of vertical members, and a third cutout on a first horizontal member in the pair of horizontal members, and a second notched corner formed by a first cutout on the first face, a second cutout on a second vertical member in the pair of vertical members, and a third cutout on the first horizontal member in the pair of horizontal members;

a filter medium located within the body, the filter medium configured to filter air passing therethrough;

a structure located within the body, the structure being at least partially exposed via the first notched corner; and a buffer material located on the second face and configured to separate the second face from one or more components of an air conditioning unit, wherein the body comprises a paper product.

2. The air filter of claim 1, wherein the first notched corner is configured to interface with at least a portion of an air conditioning unit when the filter is installed in the air conditioning unit.

3. The air filter of claim 1, wherein the structure is configured to interface with at least a portion of an air conditioning unit when the filter is installed in the air conditioning unit.

4. The air filter of claim 1, wherein the structure comprises the filter medium.

5. The air filter of claim 1, wherein the structure comprises a material that is the same as a material of the body.

6. The air filter of claim 5, wherein the body and the structure are formed from a unitary piece of material.

7. The air filter of claim 1, wherein the buffer material comprises a closed cell foam.

8. The air filter of claim 1, wherein the buffer material comprises a resilient water barrier.

9. The air filter of claim 1, wherein the air filter is configured to cover all, or substantially all, of an air intake portion of an air conditioner unit, to enable the air filter to filter air before it passes over an indoor coil and is subsequently outputted by the air conditioner unit via one or more air outlets.

10. The air filter of claim 1, wherein the buffer material is discontinuous and located at one or more discrete positions around a perimeter of the second face.

11. The air filter of claim 1, further comprising a gasket located on at least a portion of an outer edge of the body configured to ensure that substantially all passing air flows through the filter medium.

12. An air filter comprising:

a body comprising a pair of horizontal members, a pair of vertical members, a first face, and a second face, the body further comprising:

a first notched corner formed by a first cutout on the first face, a second cutout on a first vertical member in the pair of vertical members, and a third cutout on a first horizontal member in the pair of horizontal members;

a filter medium located within the body, the filter medium configured to filter air passing therethrough;

a structure located within the body, the structure being at least partially exposed via the first notched corner, wherein the structure comprises the filter medium; and a buffer material located on the second face and configured to separate the second face from one or more components of an air conditioning unit, wherein the body comprises a paper product.

13. The air filter of claim 12, further comprising a second notched corner formed by a first cutout on the first face, a second cutout on a second vertical member in the pair of vertical members, and a third cutout on the first horizontal member in the pair of horizontal members.

14. The air filter of claim 12, wherein the first notched corner is configured to interface with at least a portion of an air conditioning unit when the filter is installed in the air conditioning unit.

15. The air filter of claim 12, wherein the structure is configured to interface with at least a portion of an air conditioning unit when the filter is installed in the air conditioning unit.

16. The air filter of claim 12, wherein the buffer material comprises a closed cell foam.

17. The air filter of claim 12, wherein the buffer material comprises a resilient water barrier.

18. The air filter of claim 12, wherein the air filter is configured to cover all, or substantially all, of an air intake portion of an air conditioner unit, to enable the air filter to filter air before it passes over an indoor coil and is subsequently outputted by the air conditioner unit via one or more air outlets.

* * * * *